United States Patent [19]

Rapp

[11] Patent Number: 4,849,002

[45] Date of Patent: Jul. 18, 1989

[54] ION-EXCHANGEABLE GERMANATE METHOD FOR STRENGTHENED GERMANATE GLASS ARTICLES

[75] Inventor: Charles F. Rapp, Newark, Ohio

[73] Assignee: Kigre, Inc., Hilton Head Island, S.C.

[21] Appl. No.: 113,936

[22] Filed: Oct. 27, 1987

[51] Int. Cl.$^4$ .............................................. C03C 3/22
[52] U.S. Cl. ................................. 65/30.13; 65/3.14; 65/111; 501/37; 501/43; 501/48
[58] Field of Search ................ 65/17, 30.1, 30.13, 65/30.14, 60.51, 111, 3.14; 501/37

[56] References Cited

U.S. PATENT DOCUMENTS

| | | | |
|---|---|---|---|
| 2,779,136 | 1/1957 | Hood et al. | |
| 3,218,220 | 11/1965 | Weber | |
| 3,531,271 | 9/1970 | Dumbaugh, Jr. | |
| 3,868,170 | 2/1975 | DeLuca | |
| 3,938,974 | 2/1976 | Macedo et al. | 65/30.1 |
| 3,954,484 | 5/1976 | Broemer et al. | 501/42 |
| 3,999,994 | 12/1976 | Rapp | 501/10 |
| 4,040,846 | 8/1977 | Broemer et al. | 501/42 |
| 4,074,992 | 2/1978 | Yoss | 65/30.14 |
| 4,074,993 | 2/1978 | Ackerman et al. | 65/30.14 |
| 4,248,732 | 2/1981 | Myers et al. | |
| 4,333,648 | 6/1982 | Myers et al. | |
| 4,390,637 | 6/1983 | Daiku | |
| 4,472,030 | 9/1984 | Tachibana et al. | 65/30.13 |

OTHER PUBLICATIONS

"Properties and Structure of Glasses in the Systems $M^2O$—$In^2O^3$—$GeO^2$(M=Mi, Na, K)", *Journal of the American Ceramic Society*, vol. 56, No. 7 (Jul. 1973) pp. 349–352.

"Properties and Structure of Glass in the System $M^2O$-$Ga^2O^3$—$GeO^2$ (M=Li, Na, K)", *Physics and Chemistry of Glasses*, vol. 8, No. 1 (Feb. 1967) pp. 26–29.

"Infra-Red Spectra of Alkali-Germanate Glasses", *Physics and Chemistry of Glasses*, vol. 5, No. 5 (Oct. 1964) pp. 144–146.

"Properties and Structure of Glass in the System $M^2O$—$Al^2O^3$—$GeO^2$ (M=Li, Na, K)", *Physics and Chemistry of Glasses*, vol. 6, No. 5 (Oct. 1965) pp. 162–167.

"Infra-Red Transmitting Materials", *Journal of Materials Science*, vol. 13 (1978), pp. 2301–2312.

"Refractive Index and Density of Li, Na- and K-Germanosilicate Glasses", *Journal of Materials Science*, vol. 14 (1979) pp. 931–940.

"$Nd_{3+}$ in Germanate Glasses: Spectral and Laser Properties", *Journal of Non-Crystalline Solids*, vol. 6 (1971), pp. 342–356.

"Laser Characteristics of Neodymium-Doped Lithium Germanate Glass", *Journal of Applied Physics*, vol. 41, No. 6 (May 1970) pp. 2470–2475.

"Germanium Dioxide and Germanate Glasses", *Inorganic Glass-Forming Systems*, pp. 175–184.

"Flexual Testing of Glass (Determination of Modulus of Rupture)", *1987 Annual Book of ASTM Standards*, vol. 15.02, pp. 25–35.

"Stresses in Glass Produced by Nonuniform Exchange of Monovalent Ions", *Journal of the American Ceramic Society—Rigby and Hutton*, vol. 45, No. 2, pp. 59–68.

"Applications of Germanium and Its Alloys", Chapter 8, pp. 141–143.

*Primary Examiner*—Robert L. Lindsay
*Attorney, Agent, or Firm*—Dykema Gossett

[57] ABSTRACT

Ion exchangeable glass compositions containing from 50 to 90 mole percent $GeO_2$, from 5 to 30 mole percent $Al_2O_3$, from 3 to 30 mole percent $Li_2O$, up to 30 mole percent $Na_2O$ and up to 30 mole percent $K_2O$ are provided. In another aspect, minor amounts of anhydrous fluorides and chlorides corresponding to these oxides are added to the glass compositions to aid in water removal. Glass articles formed of the germanate glass compositions of the present invention are readily ion exchangeable when contacted with certain salts. Strengthened germanate glass articles are also provided having an inner tension region and an outer compressive surface layer which provide good mechanical strength for the formed glass article. The strengthened germanate glass articles are made using the ion exchangeable germanate glass compositions of the present invention. The compressive surface layer of the strengthened germanate glass articles are formed by contacting the surface of the glass article with a suitable salt, preferably a molten alkali salt, in an ion exchange process. The surface compressive layer of the strengthened germanate glass article has a lower concentration of lithium ions than the inner tension region and has a higher concentration of select ions provided by the salt bath.

15 Claims, No Drawings

ION-EXCHANGEABLE GERMANATE METHOD FOR STRENGTHENED GERMANATE GLASS ARTICLES

FIELD OF INVENTION

The present invention relates generally to glass and to methods for strengthening glass articles. More specifically, the present invention deals with germanate glass compositions and chemical methods for strengthening glass articles.

BACKGROUND OF THE INVENTION

For centuries, glass has been the material of choice in a wide variety of applications. Although numerous advanced non-glass materials are currently available, glass is still preferred in many instances due to its relatively low cost, good formability and hardness. However, one disadvantage of glass articles is their lack of mechanical strength. It is also known that surface flaws further reduce the strength of glass, which limits its use in applications where it is exposed to multiple impacts. Therefore, methods for fabricating high strength glasses are most desirable. Accordingly, this lack of mechanical strength has been the subject of much experimental investigation in an effort to develop strengthened glass articles.

A number of methods for strengthening silicate-based glasses have been proposed, some of which have gained widespread usage. These include both physical and chemical strengthening processes. In general, these two types of strengthening techniques create an outer layer or region of glass having high compressive stress overlying an inner tension region. This stress differential between outer and inner regions of the silicate glass articles has been achieved in the past by quenching and by the overlay of low-expansion silicate glass onto a substrate of high expansion silicate glass. In the latter case, as the laminate glass article is cooled, the greater contraction of the glass substrate places the overlay glass in compression. Limited increases in silicate glass strength have also been obtained by chill tempering, which is the most common physical method of silicate glass strengthening. Methods of chemically strengthening silicate glass typically provide an outer compression region or layer which has a different chemical composition then the interior glass region. This may be achieved by forming a composite silicate glass article in which the outer region has a lower coefficient of thermal expansion than the inner region. As the composite is cooled to a temperature below its annealing temperature, this differential in thermal expansion produces a strengthened silicate glass article having an outer compression layer and an inner tension layer.

A low-temperature method for producing an outer or surface compression layer for silicate glass articles is disclosed by S. S. Kistler, "Stresses in Glass Produced By Non-Uniform Exchange of Monovalent Ions," J. Am. Ceram. Soc. 45 [2]59–68 (1962) wherein a chemical method of silicate glass strengthening is disclosed which involves low-temperature ion exchange. Other investigators, notably Nordberg et al. in "Strengthening by Ion Exchange," J. Am. Ceram. Soc., 47 [5]215–219 (1964), describe low-temperature ion exchange strengthening of silicate glasses. Ion exchange treatment of lithia silicate laser glasses is also disclosed in U.S. Pat. No. 3,687,799 entitled "Glass Lasers of Increased Heat Dissipation Capability Made by Ion Exchange Treatment of Laser Glass."

Silicate glasses such as soda-lime-silica, lead-alkali silicate glasses, borosilicate glasses and aluminosilicate glasses exhibit various unique properties and differ from one another in softening points, electrical resistance and the like. In all silicate glasses, silica is the glass former. In essence, an irregular atomic "matrix" or network is provided by silicon and oxygen atoms which are covalently bonded together by highly directional bonds. In some silicate glasses, large metallic cations occupy sites in the network. The properties of silicate glasses are well known. In low-temperature ion exchange or ion "stuffing" of silicate glasses, monovalent ions located in the surface layer or region of a silicate glass article are substituted or replaced by larger ions, usually by a diffusion process. For example, it is known that a silicate glass article can be strengthened by placing the article in a molten alkali bath such as potassium nitrate whereby the potassium ions, which are larger than the sodium ions present in the glass, diffuse into the outer glass layer, replacing sodium ion embedded in the silicon dioxide network. In this method, the ion exchange is carried out below the annealing temperature of the glass so that the stress produced by the presence of the potassium ion sets up an outer compression layer which is not relaxed upon cooling.

While the properties of silicate glasses are understood quite well, silicate glasses are not appropriate for some purposes. More exotic "specialty" glasses have thus emerged in recent years to meet specific needs. For example, it is known that certain non-silicate glasses have special transmittance properties not available in silicate glasses. Some glass compositions transmit X-rays and, of particular interest herein, it is known that germanate glass compositions transmit infrared radiation. Since germanate glasses are more transparent to infrared radiation than silicate glasses, germanate glasses are of considerable interest in infrared technology. Unfortunately, germanate glasses suffer from the inherent drawback of most glasses; they are mechanically weak and are thus easily fractured. This lack of strength severely limits the use of germanate glass articles in many applications where its infrared transmittance properties are highly desirable. One such potential use of germanate glass articles is in connection with infrared homing devices such as missiles where glass domes and windows must be infrared transparent. However, no high strength germanate glass compositions have, to applicant's knowledge, been developed. Attempts at ion exchange strengthening of germanate glass compositions have to date been unsuccessful. Therefore, there exists a long felt need for a strengthened germanate glass article. The present invention provides ion-exchangeable germanate glass compositions and strengthened germanate glass article which satisfy this need.

SUMMARY OF THE INVENTION

In accordance with the present invention, there is provided ion-exchangeable germanate glass compositions and strengthened germanate glass articles. The novel germanate glass articles of the present invention have an outer compression layer which is formed by an ion exchange process. The germanate glass compositions as provided herein produce unexpected superior results when ion exchanged to form a strengthened glass article. The composition of the novel strengthened germanate glass article is relatively uniform except for the outer layer which, relative to the inner glass region, has a low concentration of lithium ions and a high concentration of different selected ions. The germanate glass articles of the present invention may be formed in a variety of shapes and thicknesses to suit a particular application. A method for fabricating these novel, high strength germanate glass articles is also provided.

The germanate glass compositions of the present invention contain germanium dioxide ($GeO_2$), aluminum oxide (alumina, $Al_2O_3$) and lithium oxide (lithia, $Li_2O$). In addition to these three components, in another aspect, the germanate glass compositions of the present invention include sodium oxide ($Na_2O$) and potassium oxide ($K_2O$). In some embodiments, there is also included minor amounts of chlorides and fluorides corresponding to the aforementioned oxides. These chlorides and fluorides aid in water removal. The outer or surface layer of the germanate glass articles of the present invention which are formed of the novel germanate glass compositions described herein differ in composition from the underlying or core glass region. The surface layer contains a high concentration of selected ions, preferably alkali metal ions other than lithium. This outer layer is formed by exchanging smaller ions present in the surface layer with larger ions. As will be explained more fully, this exchange of ions is carried out by contacting the surface of a germanate glass article of the present invention with selected ions under conditions which promote ion exchange. A number of monovalent ions in the surface layer are thereby replaced or substituted by larger ions. This "stuffing" of the surface layer with large ions creates a compressive stress or outer compression layer in the germanate glass article. The ion exchange is conducted under conditions which do not allow this compression layer to relax during cooling of the strengthened germanate glass article. Thus, the cooled article has a surface layer in compression and a core in tension, producing a high mechanical strength germanate glass article.

The ion exchange is preferably carried out by preparing a germanate glass article having the foregoing chemical composition and then contacting the article with a molten alkali metal salt at a temperature below the annealing temperature of the germanate glass article to ion exchange the surface layer. The resultant germanate glass article has substantially increased mechanical strength.

DESCRIPTION OF THE PREFERRED EMBODIMENTS

In one embodiment, the ion-exchangeable germanate glass compositions of the present invention contain $GeO_2$, $Al_2O_3$, and $Li_2O$. The outer surface layer or region of the germanate glass article formed from these ion-exchangeable glass compositions is modified with respect to the inner core such that the outer surface layer has a lower concentration of lithium ions than the inner region and has a higher concentration of selected ions which are larger than lithium ions. The presence of these larger ions under conditions which will be more fully explained provides a compressive stress in the surface layer relative to the inner tension core or region to provide a substantially strengthened germanate glass article. This outer or surface compression layer is preferably formed by contacting the surface of the germanate glass article with a salt under conditions which promote the exchange of larger ions of the salt for smaller ions present in the surface layer of the germanate glass article.

In a preferred embodiment, the outer surface layer of the germanate glass article of the present invention is contacted with a molten alkali metal salt for a period of time sufficient to exchange monovalent ions in the germanate glass article surface layer with alkali metal ions from the molten salt bath. A suitable molten salt preferably includes sodium or potassium ions or both. Most preferred are sodium ions which exchange well with lithium ions present in the novel ion-exchangeable glass compositions of the present invention. Other alkali metal ions may be suitable such as rubidium or cesium, alone or in combination with the other preferred alkali metal ions. Note that lithium ions are not suitable since lithium ions are the smallest replaceable ions in the preferred glass compositions. Preferred molten alkali metal salts are the alkali metal nitrates and most preferred is molten sodium nitrate ($NaNO_3$). While the anionic species of the molten salt may vary, it must be compatible with other process parameters.

The concentration of ions which are substituted into the surface layer of the germanate glass article of the present invention as well as the depth of the ion strengthened surface layer are determined by diffusion laws are thus in part a function of the length of exposure of the glass surface to the salt. Diffusion is also a function of the temperature at which the ion exchange process is carried out. The monovalent ions which are removed from the surface layer of the glass during ion exchange are predominately lithium ions. The displaced lithuim ions enter the molten salt bath as the exchange proceeds. The concentration of lithium in the molten salt bath thus increases with time during the contacting of the germanate glass article with the molten salt.

The composition of the germanate glass compositions of the present invention which demonstrate unexpected superior ion-exchange properties contain approximately 50.0 to approximately 90.0 mole percent $GeO_2$, approximately 5.0 to approximately 30.0 mole percent $Al_2O_3$ and approximately 3.0 to approximately 30.0 mole percent $Li_2O$, where the mole percentage of lithium and the mole percentage of aluminum oxide are selected such that the mole percentage of lithium is always greater than the mole percentage of aluminum. In another embodiment of the present invention, in addition to these three essential constituents, up to about 30.0 mole percent and preferably from about 0.5 to about 30.0 mole percent $Na_2O$ and/or up to about 30.0 mole percent and preferably from about 0.5 to about 30.0 mole percent $K_2O$ are included in the germanate glass composition, with the mole percentages of the various constituents being selected so that the mole percentage of $Al_2O_3$ is less than the total mole percentage of $Na_2O$, $K_2O$ and $Li_2O$ in the glass composition. That is, when the mole percentages of the oxides, $Na_2O$, $K_2O$, and $Li_2O$, are totalled, they should be more than the mole percentage of $Al_2O_3$ in the final composition. Thus, in tabular form, the preferred composition of the germanate glass which is then strengthened by ion exchange is as follows:

| Compound | Approximate mole percent based on total glass composition as oxide content before ion exchange |
|---|---|
| $GeO_2$ | 50–90 |
| $Al_2O_3$ | 5–30 |

-continued

| Compound | Approximate mole percent based on total glass composition as oxide content before ion exchange |
|---|---|
| $Li_2O$ | 3–30 |
| $Na_2O$ | 0–30 |
| $K_2O$ | 0–30 |

(the mole percentages of $Al_2O_3$, $Li_2O$, $Na_2O$ and $K_2O$ always being selected such that the mole percentage of $Al_2O_3$ is less than the combined mole percentages of $Na_2O$, $K_2O$ and $Li_2O$; that is, the mole percentage of $Al_2O_3 < Na_2O + K_2O + Li_2O$).

The most preferred ranges of ingredients for the germanate glass compositions of the present invention are set forth in the following table:

| Compound | Approximate mole percent based on total glass composition as oxide content before ion exchange |
|---|---|
| $GeO_2$ | 55–85 |
| $Al_2O_3$ | 5–25 |
| $Li_2O$ | 5–15 |
| $Na_2O$ | 5–15 |
| $K_2O$ | 0–15 |

(the mole percentages of $Al_2O_3$, $Li_2O$, $Na_2O$ and $K_2O$ always being selected such that the mole percentage of $Al_2O_3$ is less than the combined mole percentages of $Na_2O$, $K_2O$ and $Li_2O$; that is the mole percentage of $Al_2O_3 < Na_2O + K_2O + Li_2O$).

In another aspect, the germanate glass compositions of the present invention include from about 0.01 mole percent to about 5.0 mole percent of solid anhydrous chloride and/or solid anhydrous fluoride corresponding to any of the oxides listed for use herein. Preferred fluorides are selected from the group consisting of aluminum fluoride, lithium fluoride, sodium fluoride, potassium fluoride and combinations thereof. Preferred chlorides are selected from the group consisting of aluminum chloride, lithium chloride, sodium chloride, potassium chloride and combinations thereof. It is preferred that the fluorides or chlorides be used to replace an equal number of cations of the corresponding oxide. For example, if the composition includes 1.0 mole anhydrous $AlCl_3$ or anhydrous $AlF_3$, 0.5 mole less $Al_2O_3$ would be used in the germanate glass composition. The addition of small amounts of these corresponding anhydrous chlorides and fluorides aid in water removal from the germanate glasses. Melting the glass under a dry atmosphere, or bubbling a dry gas through the glass melt will also aid in water removal from the glass.

The germanate glass compositions of the present invention which exhibit superior ion-exchange characteristics as set forth herein are used to prepare the inventive strengthened glass articles in the following manner. Conventional glass preparation techniques can be used to form molten glass which is then cast in the desired shape. Suitable starting materials would include oxides, carbonates, nitrates, chlorides, fluorides, germanates, etc. Various organometallic compounds could also be utilized in the glass preparation. Less common glass forming techniques which will be understood by those skilled in the art such as the "sol-gel" process for forming glass would also be suitable. The shaped germanate glass article is then ion exchanged as will be described more fully hereinafter.

As stated, the germanate glass articles formed from the glass compositions of the present invention are unique in their ability to be strengthened through ion exchange. In the method of the present invention, shaped germanate glass articles having the inventive composition are preferably ion exchanged and thus strengthened by contacting the surfaces of the glass articles preferably with a molten salt bath. However, it is to be understood that the ionic species which is diffused into the glass article may, alternatively, be present in a suitable solvent such as an organic solvent. The salt bath is preferably a molten alkali metal salt bath other than a lithium salt bath and, as stated, preferably alkali metal salts for use in the present invention are salts of sodium, potassium, rubidium, and cesium. The addition of some lithium to the alkali metal salt bath, however, may be appropriate to control the rate of ion exchange or to lower the melting point of the alkali metal salt. Most preferred are sodium salts, preferably sodium nitrate ($NaNO_3$). In a preferred embodiment, the shaped germanate glass articles are ion exchanged by placing them in a bath of the molten alkali metal salt. Alkali ions in the salt bath diffuse into the surface of the germanate glass articles where they are "exchanged" for small ions present in the glass. That is, the ionic radii of alkali metal ions may be ranked in the following manner: lithium < sodium < potassium < rubidium < cesium. Thus, where the molten alkali salt bath contains sodium ions, sodium ions replace lithium ions in the glass structure. Accordingly, where the glass composition of the present invention includes $Na_2O$ and the molten salt bath contains potassium ions, the larger potassium ions replace some of the lithium ions and some of the sodium ions in the surface layer of the glass article. It is to be understood that it the substitution of the these larger ions for smaller ions in the surface layer of the germanate glass article which sets up a significant stress or compressive layer at the surface of the glass article. This high compressive stress outer layer overlies an inner tension region or core of the glass article since no substantial exchange of ions occurs in the inner glass region. This produces a significantly strengthened germanate glass article as demonstrated with reference to rupture test data set forth in the examples, infra. Where the glass composition contains lithium and sodium, and the salt bath contains sodium, the sodium will replace both lithium and sodium ions in the glass. While the sodium for sodium exchange will have no effect, the sodium for lithium exchange will strengthen the glass. It is theorized that depending on the relative amounts of Na, K, and Li in a glass, the glass could still be strengthened in a Na bath because of a preferential exchange of Na for Li.

The temperature of the molten salt bath during the contacting of the germanate glass article is important in one aspect. During the ion exchange process, the germanate glass article must be maintained at a temperature less than its annealing temperature. That is, the glass article and the salt bath must be such that the surface layer of the glass article which is transformed into a compressive layer must always be beneath the annealing temperature of the glass article to prevent relaxation of the outer compressive stress layer. Of course, the salt bath should be at an elevated temperature which is high enough to facilitate fairly rapid diffusion of the selected ions into the glass article. The preferred temperature of the molten salt bath is approximately 280 to appartoximately 410 degrees C, more preferably approximately 320 to approximately 380 degrees C and most preferably about 368 degrees C. Temperatures outside these ranges may be suitable in a particular application. Also, if it is necessary that the germanate glass article be ground and polished, it is preferable that this be done before they are contacted with the molten alkali metal salt bath. Conventional grinding and polishing techniques are suitable for this purpose.

The depth and thickness of the compressive layer is determined in part by the length of time which the germanate glass article is exposed to the salt bath. In the case of a molten alkali metal salt bath at a temperature within the preferred range set forth above, it is preferred that the germanate glass article be contacted with salt bath for a period of approximately 1 to approximately 500 hours, more preferably approximately 8 to approximately 100 hours and most preferably from about 16 hours to about 88 hours. An exposure of this length of time at these temperatures would produce a compressive layer of about 10 to about 400 microns and preferably from about 120 microns to about 300 microns thick which provides excellent mechanical strength for the final article. It may also be desirable to subject the germanate glass article to an acid wash such as hydrofluoric acid prior to the step of contacting the surface with the salt bath to remove surface irregularities which are known to effect strength. Also, an acid wash following formation of the compressive layer may be desirable to remove a very thin tension layer which sometimes forms overlying the compressive layer. It should also be noted that other ionic species such as silver can be diffused into the surface of the germanate glass articles of the present invention in lieu of alkali and metal ions.

Thus, the mechanical strength of the germanate glass article is substantially increased by the present invention in which ion-exchangeable germanate glass compositions are defined, articles of which are then ion exchanged to form a compressive surface layer surrounding an inner tension region. The final strengthened germanate glass articles of the present invention are characterized in that they contain from about 50.0 to about 90.0 mole percent $GeO_2$, from about 5.0 to about 30.0 mole percent $Al_2O_3$, from about 3.0 to about 30.0 mole percent $Li_2O$, from about 0.0 to about 30.0 mole percent $Na_2O$ and from about 0.0 to about 30.0 mole percent $K_2O$, where the mole percent of $Al_2O_3$ is less than the total mole percent of $Na_2O + K_2O + Li_2O$. The germanate glass articles of the present invention have a surface layer which is in compression stress and the compressive layer of the glass article has a lower concentration of lithium ions and a greater concentration of other ions than the inner tension region of the glass article.

The following examples are set forth to further illustrate and describe the present invention and are not intended in any way to limit the scope of the present invention.

EXAMPLES

A. Enhanced ion exchange

Examples are given below as Glasses 1 through 4. Glasses 5 and 6 are germanate glasses which have not shown good ion exchange under the same conditions.

|  | MOLE PERCENT | | | | | |
| --- | --- | --- | --- | --- | --- | --- |
|  | #1 (G107) | #2 (G110) | #3 (G113) | #4 (G114) | #5 (G108) | #6 (G109) |
| $GeO_2$ | 66 | 66 | 66 | 66 | 58.6 | 40.59 |
| $Al_2O_3$ | 12 | 12 | 12 | 12 | — | 22.84 |
| $Li_2O$ | 11 | 11 | 11 | 11 | 8.7 | 8.40 |
| $Na_2O$ | 11 | 10 | 8 | 5.5 | — | — |
| CaO | — | — | — | 5.5 | 3.3 | 24.18 |
| BaO | — | — | — | — | 12.0 | 2.00 |
| ZnO | — | — | — | — | 10.9 | 2.00 |
| $TiO_2$ | — | — | — | — | 4.3 | — |
| $ZrO_2$ | — | — | — | — | 2.2 | — |
| NaF | — | 2 | 6 | — | — | — |

In accordance with the present invention, ground and polished samples 1 through 6 approximately 1 cm×2 cm×3 mm thick were placed in a molten $NaNO_3$ salt bath at 368 degrees C. and held for 16 hours. When examined under a polariscope a significant degree of stress had been generated in Glasses 1, 2, 3 and 4. However, no significant increase in stress was seen for Glasses 5 or 6, even though the glasses contained significant amounts of $Li_2O$.

Similar samples of Glasses 1, 2, 3, 5 and 6 were placed in a molten $NaNO_3$ salt bath at 360 degrees C and held for 16 hours. When examined under a polariscope similar results were observed. Glasses 1, 2 and 3 had developed a significant amount of stress while Glasses 5 and 6 had not.

B. Increased mechanical strength

MODULES OF RUPTURE OF THREE (3) 3/16 INCH DIAMETER GERMANATE GLASS RODS

The strength of strengthened germanate glass rods made in accordance with this invention was measured using the procedures of ASTM C 158-84 Method B which is incorporated herein by reference. The modulus of rupture of nonstrengthened glass is typically between 10,000 to 15,000 psi.

| | TEST CONDITIONS: Temperature 70 degrees F., 50% R.H. | | | | |
| --- | --- | --- | --- | --- | --- |
| Sample | Length (in.) Support Span | Loading Edge Span (in.) | Moment (in.) | Arm Diameter of Rod (in.) | Modulus Of Rupture (psi) |
| A | 4.000 | 0.750 | 1.625 | 0.1887 | 39,600 |
| B | 3.250 | 0.750 | 1.250 | 0.1880 | 41.500 |
| C | 4.000 | 0.750 | 1.625 | 0.1884 | 29,100 |

The present invention thus increases rupture strength significantly.

While particular embodiments of this invention have been shown and described herein, it will be understood, of course, that the invention is not to be limited thereto since many modifications may be made, particularly by those skilled in this art, in light of this disclosure. It is contemplated therefore by the appended claims to cover any such modifications as fall within the true spirit and scope of this invention.

What is claimed is:

1. A method for making a strengthened substantially infrared transparent germanate glass article comprising the steps of:

forming a substantially infrared transparent germanate glass article consisting essentially of from about 50 to 90 mole percent $GeO_2$, from about 5.0 to 30.0 mole percent $Al_2O_3$ and from about 3.0 to about 30.0 mole percent $Li_2O$, wherein the mole percentage of $Al_2O_3$ is less than the mole percentage of $Li_2O$;

contacting the surface of said germanate glass article with a salt bath, said salt bath containing selected ions having ionic radii larger than the ionic radius of an ion of lithium;

maintaining said salt bath at a temperature beneath the annealing temperature of said germanate glass article; and diffusing said selected ions into the surface of said germanate glass article such that said selected ions replace lithium ions in said germanate glass articles to create a compressive surface layer of said germanate glass article such that said germanate glass article has increased mechanical strength.

2. The method for making a strengthened germanate glass article of claim 1 wherein said forming step further includes combining up to approximately 30.0 mole percent $Na_2O$ with said $GeO_2$, $Al_2O_3$ and $Li_2O$, and wherein the combined mole percentage of $Al_2O_3$ and $Na_2O$ is less than the mole percentage of $Li_2O$.

3. The method for making a strengthened germanate glass article of claim 1 wherein said forming step further includes combining up to approximately 30.0 mole percent $K_2O$ with said $GeO_2$, $Al_2O_3$ and $Li_2O$, and wherein the combined mole percentage of $Al_2O_3$ and $K_2O$ is less than the mole percentage of $Li_2O$.

4. The method for making a strengthened germanate glass article of claim 2 wherein said forming step further includes combining up to approximately 30.0 mole percent $K_2O$ with said $GeO_2$, $Al_2O_3$, $Li_2O$ and $Na_2O$, and wherein the combined mole percentage of $Al_2O_3$ and $K_2O$ is less than the mole percentage of $Li_2O$.

5. The method for making a strengthened germanate glass article of claim 1 wherein said salt bath is a molten salt bath.

6. The method for making a strengthened germanate glass article of claim 1 wherein said salt bath is a molten alkali metal salt bath.

7. The method for making a strengthened germanate glass article of claim 1 wherein said salt bath is a molten alkali metal salt bath selected from the group consisting of sodium, potassium, rubidium and cesium salt baths and combinations thereof.

8. The method for making a strengthened germanate glass article of claim 1 wherein said salt bath has a temperature of between about 280 and about 410 degrees C during said contacting step.

9. The method for making a strengthened germanate glass article of claim 1 wherein said contacting is carried out for a period of from about 1 to about 500 hours.

10. A method for making a strengthened, substantially infrared transparent germanate glass article comprising the steps of:

forming a substantially infrared germanate glass article consisting essentially of from about 55.0 mole percent to about 85.0 mole percent $GeO_2$, about 6.0 mole percent to about 25.0 mole percent $Al_2O_3$, and about 5.0 mole percent to about 15.0 mole percent $Li_2O$, wherein the mole percentage of $Al_2O_3$ is less than the mole percentage of $Li_2O$;

preparing a molten alkali metal salt bath wherein said alkali metal salt is selected from the group consisting of sodium, potassium, rubidium, and cesium and combinations thereof;

maintaining said salt bath at a temperature below the annealing temperature of said germanate glass article;

diffusing said selected ions into the surface of said germanate glass article such that said selected ions replace lithium ions in said germanate glass article to create a compressive surface layer of said germanate glass article such that said germanate glass article has increased mechanical strength.

11. The method for making a strengthened germanate glass article recited in claim 10, wherein said step of diffusing is carried out for a period of time sufficient to produce said compressive layer in a thickess of from about 10 to about 400 microns.

12. The method for making a strengthened germanate glass article recited in claim 10, wherein said step further includes combining from about 5 to about 15 mole percent $Na_2O$ with said $GeO_2$, $Al_2O_3$ and $Li_2O$, and wherein the combined mole percentage of $Al_2O_3$ and $Na_2O$ is less than the mole percentage of $Li_2O$.

13. The method for making a strengthened germanate glass article recited in claim 12, wherein said forming step further includes combining up to about 15 mole percent $K_2O$ with said $GeO_2$, $Al_2O_3$, $Li_2O$ and $Na_2O$, and wherein the combined mole percentage of $Al_2O_3$, $Na_2O$ and $K_2O$ is less than the mole percentage of $Li_2O$.

14. The method for making a strengthened germanate glass article of claims 1, 2, 3, 4, 10, 12 or 13, wherein said forming step further includes combining with said $GeO_2$, $Al_2O_3$ and $Li_2O$ up to approximately 5.0 mole percent of a fluoride selected from the group consisting of aluminum fluoride, lithium fluoride, sodium fluoride and potassium fluoride and combinations thereof.

15. The method for making a strengthened germanate glass article of claims 1, 2, 3, 4, 10, 12, or 13, wherein said forming step further includes combining with said $GeO_2$, $Al_2O_3$ and $Li_2O$ up to approximately 5.0 mole percent of a chloride selected from the group consisting of aluminum chloride, lithium chloride, sodium chloride and potassium chloride and combinations thereof.

* * * * *